United States Patent
Robinson

(10) Patent No.: US 10,307,975 B2
(45) Date of Patent: Jun. 4, 2019

(54) RESIN-INFUSION PROCESS FOR COMPOSITES MANUFACTURING

(71) Applicant: Rohr, Inc., Chula Vista, CA (US)

(72) Inventor: John W. Robinson, Fernandina Beach, FL (US)

(73) Assignee: ROHR, INC., Chula Vista, CA (US)

(*) Notice: Subject to any disclaimer, the term of this patent is extended or adjusted under 35 U.S.C. 154(b) by 545 days.

(21) Appl. No.: 14/802,328

(22) Filed: Jul. 17, 2015

(65) Prior Publication Data
US 2017/0015030 A1    Jan. 19, 2017

(51) Int. Cl.
| | |
|---|---|
| B29C 70/54 | (2006.01) |
| B29C 70/68 | (2006.01) |
| B29C 70/48 | (2006.01) |
| B29L 22/00 | (2006.01) |

(52) U.S. Cl.
CPC ......... B29C 70/682 (2013.01); B29C 70/48 (2013.01); B29C 70/548 (2013.01); *B29L 2022/00* (2013.01)

(58) Field of Classification Search
CPC ............... B29C 33/505; B29C 2033/422
See application file for complete search history.

(56) References Cited

U.S. PATENT DOCUMENTS

| | | | |
|---|---|---|---|
| 4,504,530 A | 3/1985 | Bliley | |
| 5,484,642 A * | 1/1996 | Bompard | B29C 70/22 428/166 |
| 5,545,132 A * | 8/1996 | Fagan | A61M 25/1002 604/103.08 |
| 6,156,842 A * | 12/2000 | Hoenig | C08L 23/08 428/373 |
| 6,919,039 B2 * | 7/2005 | Lang | B29C 33/0066 264/102 |
| 7,607,634 B2 | 10/2009 | Browne et al. | |
| 7,622,069 B1 | 11/2009 | Kia et al. | |
| 7,910,038 B2 | 3/2011 | Kia et al. | |

(Continued)

FOREIGN PATENT DOCUMENTS

| | | |
|---|---|---|
| EP | 0322042 A | 6/1989 |
| EP | 0465169 A1 | 1/1992 |

(Continued)

OTHER PUBLICATIONS

GB Search Report for International Application No. 1612393.7, dated Jan. 13, 2017, 6 pages.

*Primary Examiner* — Monica A Huson
*Assistant Examiner* — Kelsey C Grace
(74) *Attorney, Agent, or Firm* — Cantor Colburn LLP

(57) ABSTRACT

A resin-infusion system for manufacture of a composite part includes an inflatable rigid bladder defining at least one infusion-flow medium and a preform lay-up formed on the bladder such that the infusion-flow medium defines space between the bladder and preform lay-up. The system also includes a mold into which the bladder and preform lay-up are placed such that the preform lay-up is constrained against the mold a resin injection system configured to feed resin into and to flow along the infusion-flow medium and then be infused into the preform lay-up. The bladder is configured to expand against the infused preform lay-up during curing such that the infusion-flow medium is smoothed resulting in a smooth surface of the finished part.

10 Claims, 2 Drawing Sheets

(56) References Cited

U.S. PATENT DOCUMENTS

| | | |
|---|---|---|
| 8,815,145 B2 | 8/2014 | Everhart et al. |
| 8,974,217 B2 | 3/2015 | Everhart et al. |
| 2009/0041972 A1* | 2/2009 | Rodman ................. B29C 70/44 428/85 |
| 2010/0204773 A1* | 8/2010 | Elmaleh .................... A61F 2/07 623/1.11 |
| 2011/0169190 A1 | 7/2011 | Miller et al. |

FOREIGN PATENT DOCUMENTS

| | | |
|---|---|---|
| FR | 2894874 A1 | 6/2007 |
| JP | 2013216017 A | 10/2013 |
| WO | 2007054097 A1 | 5/2007 |

\* cited by examiner

RESIN-INFUSION PROCESS FOR COMPOSITES MANUFACTURING

BACKGROUND

The invention relates to, in general, a process for manufacturing composite components or parts and, in particular, a resin infusion system for the manufacture of parts having generally hollow cross-sections.

Polymer matrix composites (PMC) may be used in a variety of applications, such as in the aerospace industry, due to their favorable combination of mechanical properties. In general, PMCs can be used in structures that are lighter or stronger than their metallic counterparts. PMCs typically consist of a reinforcing fiber/fabric, such as fiberglass, Kevlar®, or carbon, embedded in a polymer matrix, such as a thermoset or thermoplastic polymer, that binds together the fiber/fabric. There are numerous manufacturing processes for PMCs. One family of processes is resin transfer molding (RTM). In RTM dry fiber/fabric is laid up onto on open or inside a closed mold and formed to the shape of the part. Then liquid resin is infused into the dry fiber/fabric, ideally completely wetting all the fibers and encapsulating them in the resin. Finally, the resin is cured, in the case of a thermoset polymer matrix, or cooled, in the case of thermoplastic polymer matrix, to solidify the composite structure and form the part.

In an RTM process, great care and planning is typically required to ensure that the resin flows in the desired way around the dry fiber/fabric, and completely wets the fibers. The resin can be pushed under pressure into the fiber/fabric, or pulled under a vacuum, or a combination of each. The viscosity of the resin can be controlled or affected to aid in resin flow and wetting. Flow channels can be provided in the part or through the use of consumables in order to allow the liquid resin to flow around and cover the surface of the fiber/fabric, before turning and flowing through it.

Another major family of manufacturing processes utilizes prepregs. Prepregs are reinforcing fibers or fabrics that are pre-impregnated with a polymer matrix. The prepreg is flexible when molded into the part shape, then cured or hardened to a rigid form. One form or prepreg processing has been developed for forming parts that are complex in shape, and have a generally hollow or open cross-sectional shape. The process involves the use of polymer mandrel that is formed into the interior cross-sectional shape of the part. Then the prepreg fabric is laid up on or around the mandrel to form a preform. The mandrel and the preform are placed inside of a closed, sealed mold. Provision is made in the mold tooling to allow hot, compressed air to be injected inside of the mandrel. The mandrel heats up and becomes flexible, and the pressure of the air pushes the mandrel against the preform and against the external mold surface of the mold tooling. Through the application of pressure and heat against the preform, the preform is consolidated and then cured. The cured part, with the mandrel still inside, is removed from the mold tooling. The mandrel can then be reheated to a temperature which makes it pliable enough to remove from the part interior.

The above-described process of forming complexly shaped, hollow cross-section parts is effective when the PMC material system to be used for the part is available in prepreg form. However, some material systems are not available or well-suited to the prepreg form, or may be too expensive or unwieldy in prepreg form. It would be beneficial to be able to use the above-described process with dry fiber/fabric and infuse the resin.

SUMMARY

According to one embodiment, a resin-infusion system for manufacture of a composite part is disclosed. The system includes an inflatable rigid bladder defining at least one infusion-flow medium and a preform lay-up formed on the bladder such that the infusion-flow medium defines space between the bladder and preform lay-up. The system also includes a mold into which the bladder and preform lay-up are placed such that the preform lay-up is constrained against the mold and a resin injection system configured to feed resin into and to flow along the infusion-flow medium and be infused into the preform lay-up. The bladder is configured to expand against the infused preform lay-up during consolidation and curing such that the infusion-flow medium is smoothed resulting in a smooth surface of the finished part.

According to another embodiment, a bladder for use in a resin-infusion system for manufacture of a composite part is disclosed. The bladder includes an outer surface having a plurality of integrally formed infusion flow medium formed thereon. The outer surface is formed of a material that becomes softer above a transition temperature.

In one embodiment, the at least one infusion-flow medium is substantially uniform throughout an entirety of a length of the infusion-flow medium. In another embodiment, a transverse cross-section of the at least one infusion-flow medium is substantially hemispherical. In another embodiment, the bladder includes a plurality of infusion-flow media. In an aspect of this embodiment, the infusion-flow media are uniform with respect to each other. In another aspect of this embodiment, a first set of the infusion-flow media are substantially parallel with respect to each other, a second set of the infusion-flow media are substantially parallel with respect to each other and substantially perpendicular with respect to the first set of the infusion-flow media. In a version of this aspect, the first and second sets of the infusion-flow media intersect with each other to form a "multi-diamond" design for the bladder.

According to yet another embodiment, a method of forming a piece includes: placing a bladder and preform layup that surrounds the bladder in a clamshell mold; providing resin to an internal cavity of the clamshell mold; applying a vacuum to the clamshell mold to cause resin to flow from the internal cavity between the preform layup and an outer surface of the bladder; inflating the bladder with hot air to push the resin against and into the preform lay-up and, in turn, the preform lay-up against a clamshell mold inner surface; curing the resin; deflating and removing the bladder; and removing the preform layer from the clamshell.

In one embodiment, the at least one infusion-flow medium is substantially uniform throughout an entirety of a length of the infusion-flow medium.

In another embodiment, a transverse cross-section of the at least one infusion-flow medium is substantially hemispherical.

In another embodiment, the bladder includes a plurality of infusion-flow media. In an aspect of this embodiment, the infusion-flow media are uniform with respect to each other. In another aspect of this embodiment, a first set of the infusion-flow media are substantially parallel with respect to each other, a second set of the infusion-flow media are substantially parallel with respect to each other and substantially perpendicular with respect to the first set of the infusion-flow media. In a version of this aspect, the first and second sets of the infusion-flow media intersect with each other to form a "multi-diamond" design for the bladder.

The resin-infusion system and method for manufacture of structural composite parts according to the invention requires few if any consumables. Also, the system allows for simple infusion and low-resistant flow of the resin. Furthermore, the bladder can be pressurized to assist in consolidation of the preform lay-up. In addition, the system allows for the lay-up to be heated and pressurized simultaneously without risk of damaging the tool or part.

BRIEF DESCRIPTION OF DRAWING

The subject matter that is regarded as the invention is particularly pointed out and distinctly claimed in the claims at the conclusion of the specification. The foregoing and other features and advantages of the invention are apparent from the following detailed description taken in conjunction with the accompanying drawing in which:

DETAILED DESCRIPTION

Figure 1:
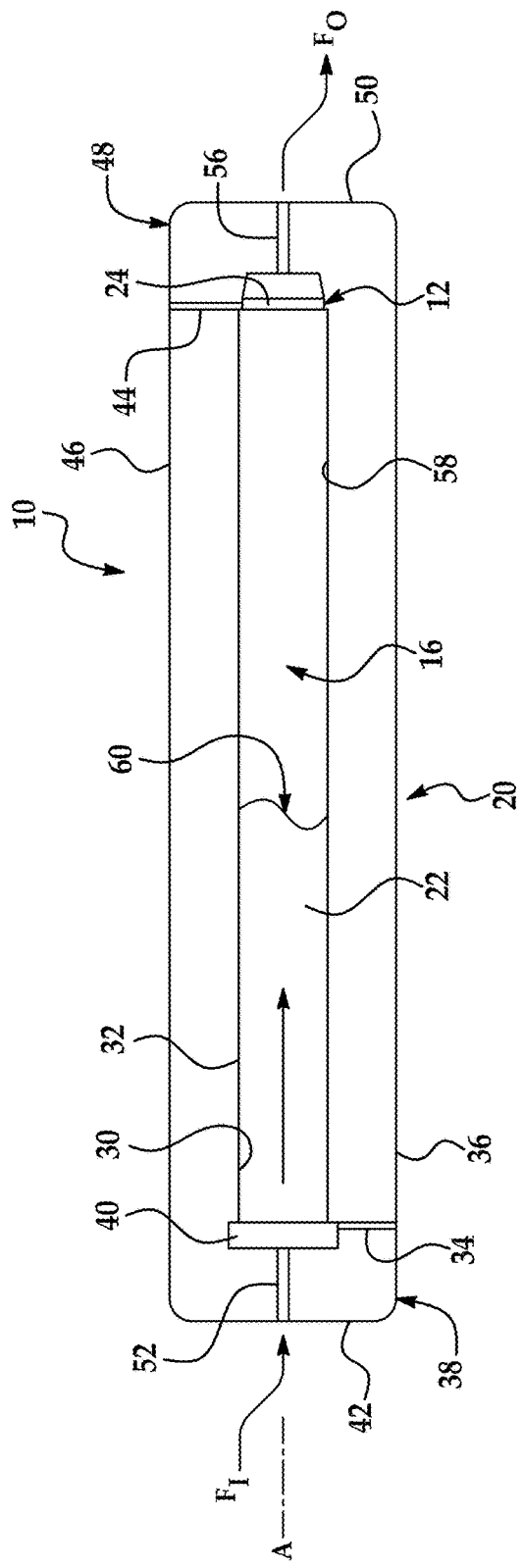
FIG. 1 is a schematic top view of a non-limiting exemplary embodiment of a resin-infusion system for manufacture of structural composite parts in accordance with the invention with a top half of the mold being removed.

The figures show a non-limiting exemplary embodiment of a resin-infusion system for manufacture of structural composite parts according to the invention, generally indicated at 10. The system 10 may find special application in the manufacture of aerospace composite parts—more specifically, flexible-matrix-composite parts (FMC parts) or rigid-matrix-composite parts (RMC parts) in the aircraft industry. The system 10 is specially adapted for the production of hollow or open cross-section parts. For example, the system 10 can be used in the manufacture of rotor hubs of vertical lift aircraft, such as helicopters. However, it should be readily appreciated by those having ordinary skill in the related art that the system 10 can find application in the manufacture of any suitable composite parts in any suitable industry, such as the automotive industry. Also, each composite part can have any suitable shape (e.g., contoured, curved, linear, etc.), size, and structure (e.g., compound or otherwise).

Referring now to FIGS. 1 through 4B, the system 10 includes, in general, an inflatable rigid bladder, generally indicated at 12, defining at least one infusion-flow medium, generally indicated at 14. The bladder 12 may be formed of a material that is initially rigid or semi rigid and that becomes softer as it is heated. In particular, a material may be selected that becomes softer above a transition temperature.

A preform lay-up, generally indicated at 16, is formed on or placed over the bladder 12 such that the infusion-flow medium 14 defines space 18 between the bladder 12 and preform lay-up 16. The bladder 12 and preform lay-up 16 are placed and sealed into a mold, generally indicated at 20, such that the preform lay-up 16 is constrained against the mold 20. Resin 22 is fed into and configured to flow along the infusion-flow medium 14 and then to infuse the preform lay-up 16. The bladder 12 is configured to expand against the infused preform lay-up 16 during consolidation and curing, while the infusion-flow medium 14 is smoothed or flattened so that the surface of the finished part against the bladder will be smooth.

More specifically, in a non-limiting exemplary embodiment of the system 10, the bladder 12 may be a formed, inflatable, memory-polymer bladder 12 of unitary or multi-segmented structure. For simplicity, each of the bladder 12 and preform lay-up 16 shown in the figures is illustrated as a simple tube. Of course, the bladder 12 and preform lay-up 16 could be other more complicated shapes. In a "rotor hub" application, the bladder 12 and preform lay-up 16 may be approximately 4.5 feet long.

An outer surface 24 of the bladder 12 is integrally textured with the infusion-flow medium 14 (i.e., the infusion-flow medium 14 is textured onto the bladder outer surface 24). In an aspect of the embodiment, the infusion-flow medium 14 takes the form of a flow-distribution gap or pathway 14. In a version of this aspect, as shown in FIGS. 2 and 3, the bladder outer surface 24 is textured with a plurality of flow-distribution pathways 14.

The flow-distribution pathways 14 may extend substantially linearly along the bladder 12 from one end of the bladder 12 to the other end of the bladder 12. In an aspect, such extension is in a non-parallel manner with respect to a longitudinal axis A defined by the bladder 12. In one version, the flow-distribution pathways 14 extend at about forty-five degrees relative to the longitudinal axis A. In this way, the flow-distribution pathways 14 wind completely about the bladder 12. Each individual flow-distribution pathway 14 may be uniform throughout an entirety of a length of the flow-distribution pathway 14, and the flow-distribution pathways 14 may be parallel to one another. A transverse cross-section of each flow-distribution pathway 14 may be substantially hemispherical.

The shape and dimensions of each flow-distribution pathway 14 may depend upon the viscosity (i.e., degree of pliability) of the resin 22 to be used. For instance, a greater amount of the viscosity may permit shallower pathways 14, whereas a higher viscosity may require deeper pathways 14.

Figure 2:
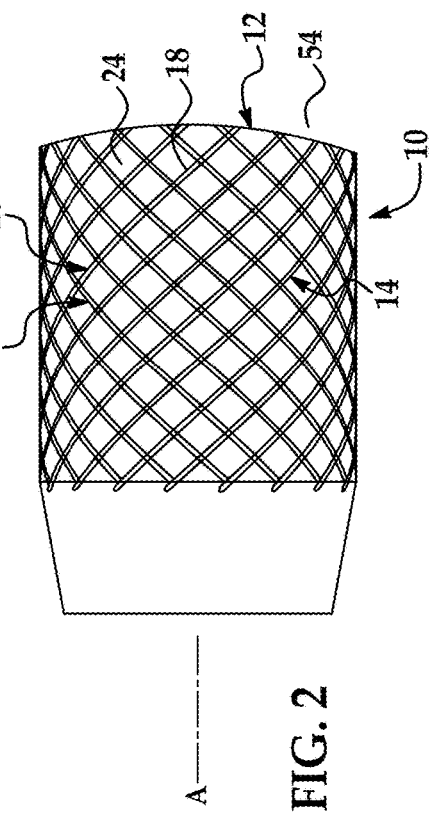
FIG. 2 is a schematic view of a portion of the inflatable rigid bladder of the resin-infusion system illustrated in FIG. 1 showing a non-limiting exemplary embodiment of a plurality of infusion-flow media textured into an outer surface of the bladder.
Figure 3:
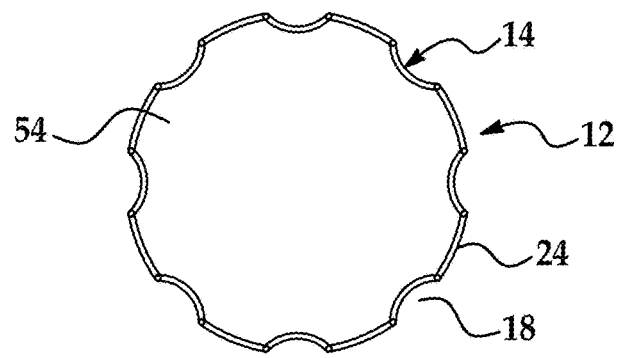
FIG. 3 is a schematic sectional view of the inflatable rigid bladder illustrated in FIG. 2 showing the plurality of infusion-flow media textured into the bladder outer surface.

In the example shown in FIG. 2, a first set, generally indicated at 26, of the flow-distribution pathways 14 are disposed parallel with respect to each other. A second set, generally indicated at 28, of the flow-distribution pathways 14 are disposed parallel with respect to each other and angled with respect to the first set of the flow-distribution pathways 14. In this way, the first and second sets 26, 28 of the flow-distribution pathways 14 intersect with each other to form a "multi-diamond" design (as viewed along the longitudinal axis A) for the textured bladder outer surface 24.

It should be readily appreciated by those having ordinary skill in the related art that the bladder outer surface 24 can be textured with any suitable design and number of the infusion-flow media 14, in any suitable manner, and by any suitable method.

The preform lay-up 16 is made from dry, non-impregnated fiber or fabric. The preform layup could be made from any of a number of possible fiber forms, in order to suit the particular component design. Woven and non-woven fabrics, filament wound tape, and 3D braided fabrics are non-limiting examples. The fiber can be any suitable reinforcing fiber used to form a PMC, such as carbon or glass fibers or other similar fibers. The preform may be placed around or formed around the bladder 12 in any suitable manner, such as by filament winding or braiding.

The resin to be injected into and infused into the preform lay up 16 can be any suitable thermoset or thermoplastic polymer resin, or other resins, as may be selected by a person of ordinary skill in this art to suit the particular component to be formed. In one non-limiting example, the resin may be a liquid urethane resin.

The bladder 12 may be bridged across the mold 20. In an aspect, the mold is a forming/curing mold 20—in particular, a multi-piece metal clamshell mold 20—and can be part of a larger tool. Also, at least one co-cured component (not shown) can be manually placed inside the clamshell mold 20 to be bonded with the preform when it is cured.

The clamshell mold 20 is prepared for placement of the bladder 12 and preform lay-up 16 inside the clamshell mold 20. Toward that end, a suitable mold-release agent (not shown) can be applied to or coated on an inner surface 30 of the clamshell mold 20 (i.e., an outside mold line (OML) 30). An O-ring seal and other sealing components (not shown) can be utilized between the clamshell mold 20 halves in order to form a sealed chamber into which the bladder 12 and preform are positioned. The bladder 12 and preform lay-up 16 are manually placed inside the prepared clamshell mold 20. The clamshell mold 20 is manually closed and sealed or secured—e.g., bolted.

In forming the composite part, tooling hardware is manually inserted into or added or connected to the bladder 12 and/or defined in the clamshell mold 20. More specifically, the system 10 is coupled to a suitable source (not shown) of the resin 22. At least one resin-feed line 34 is defined through the closed and secured clamshell mold 20 and, along with an attendant valve (not shown), configured to allow the resin 22 to enter internally of the clamshell mold 20. In an aspect, the resin-feed cavity 34 extends radially through a first side 36 of a first end portion, generally indicated at 38, of the clamshell mold 20. At least one cavity 40 may be defined by the mold 20 and configured to pool the resin 22 in the cavity 40. If necessitated by the complexity of the part and the resin flow during infusion, more than one resin-feed lines 34 and/or cavities 40 may be formed to assist with resin insertion into the mold.

At least one vacuum line 44 may be defined through the clamshell mold 20. Along with an attendant valve (not shown) and at least one pneumatic fitting (not shown), the vacuum line 44 is configured to allow vacuum to be applied to the flowing resin, and serve as an exit for the resin 22 exteriorly of the clamshell mold 20. In an aspect, the vacuum line 44 extends radially through a second side 46 of a second end portion, generally indicated at 48, of the clamshell mold 20. In an alternative aspect, multiple vacuum lines 44 can extend through the clamshell mold 20 in order to better accommodate complex part geometries and resin flow.

The system may include a source or respective sources (not shown) of compressed air and a venting environment positioned external to the clamshell mold 20. The system 10 may also include an air regulator (not shown) operatively connected to the source or respective sources of the compressed air and the venting environment and configured to regulate the pressure of air inside of the bladder 12 for controlling inflation and deflation of the bladder 12. The source(s) of compressed air, vents, and air regulator will be selectable by those of skill in this art to suit the particular application.

At least one internal-pressure port 52 may be defined through the clamshell mold 20 and configured, in conjunction with a valve (not shown) and at least one pneumatic fitting (not shown), to supply an incoming flow $F_I$ of hot air and pressure to an interior 54 of the bladder 12. The internal-pressure port 52 and a pneumatic passageway of an interior of the pneumatic fitting couples the bladder 12 through the valve to the air regulator. In an aspect, the internal-pressure port 52 extends axially through the first end 42 of the clamshell mold 20.

At least one other cavity 56 may be defined through the clamshell mold 20 and configured to, in conjunction with a valve (not shown), supply an outgoing flow $F_O$ to relieve air exteriorly of the clamshell mold 20. In an aspect, the air-relief cavity 56 extends axially through the second end 50 of the clamshell mold 20.

It should be readily appreciated by those having ordinary skill in the related art that the resin source can be any suitable resin source and can be coupled to the system 10 in any suitable manner. Also, each of the resin-feed line 34, resin-pool cavity 40, vacuum line 44, internal-pressure port 52, and air-relief cavity 56 can have any suitable shape and size and relationship with a remainder of the system 10 and operate in any suitable manner. Furthermore, the system 10 can define any suitable number of each of the resin-feed cavity 34, resin-pool cavity 40, vacuum line 44, internal-pressure port 52, and air-relief cavity 56. In addition, the O-ring seal can have any suitable shape, size, and structure and relationship with a remainder of the system 10 and operate in any suitable manner to vacuum-seal and prevent leaks. Moreover, the valves and pneumatic fittings can be conventional in the related art.

In an exemplary resin-infusion process, the vacuum line 44 is turned on to pull a low amount of vacuum pressure to the right (as viewed in FIG. 1), and a low amount of heat is applied. Toward that end, the clamshell mold 20 may include a heater system (not shown) to heat or maintain the temperate of the resin to ensure continued flowing and adequate viscosity. Alternatively, the bladder 12, clamshell mold 20, and pneumatic fitting can be manually placed in a heater—for example, a heated oven. Alternatively, the system 10 can include at least one heater positioned externally of the clamshell mold 20.

Figure 4A:
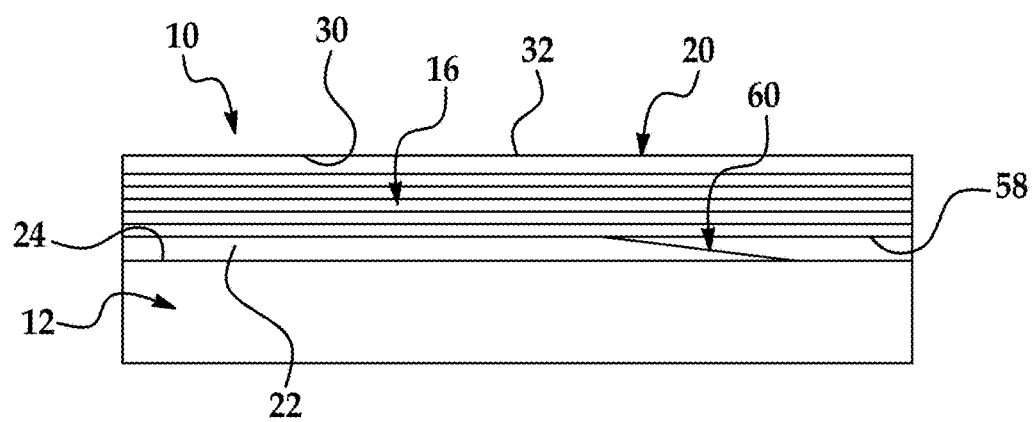
FIG. 4A is a schematic representation showing a portion of the system during application of only a low amount of heat and vacuum pressure for the infusion of the preform lay-up with the resin and before the expansion of the bladder against the preform lay-up.

The resin source injects resin into the clamshell mold 20. The resin-feed cavity 34 allows the injected resin 22 to flow between the bladder outer surface 24 and an inner surface 58 of the preform lay-up 16 so that the flow-distribution pathways 14 are fed the resin 22 from left to right (as indicated by the arrow viewed in FIG. 1). In this way, as shown in FIG. 4A, a front, generally indicated at 60, of the resin 22 is pulled via the vacuum pressure only to flow along and over the bladder outer surface 24, in general, and through flow-distribution pathways 14, in particular, away from the resin-feed cavity 34. The vacuum line 44 is shut off to halt the flow of the resin 22 when the preform lay-up 16 is fully infused and resin 22 exits the vacuum line 44 exteriorly of the clamshell mold 20 and is bubble-free. The flow of resin inside the mold and infusion into the preform lay up 16 may be assisted by vacuum, by pressure, or a combination of both.

After the resin 22 has adequately filled and infused the preform lay-up 16, forming air pressure and increased heat are applied simultaneously through the pneumatic fitting to the bladder interior 54 until it reaches a predetermined design temperature and pressure. Toward that end, hot air is supplied to the bladder interior 54 via the internal-pressure port 52. The bladder 12 is heated above the transition temperature so that the bladder 12 is sufficiently flexible. In an aspect, the temperature of the air is about 200° F. The air pressure is about 50 psi and applied to the internal-pressure port 52. The pressure may be adjusted as required.

Figure 4B:
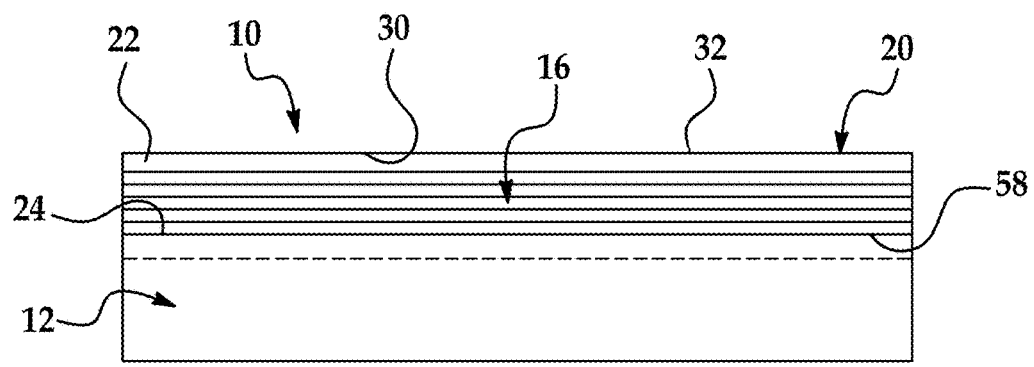
FIG. 4B is a schematic representation showing the portion of the system illustrated in FIG. 4A after the expansion of the bladder against the preform lay-up and during curing of the composite part.

In this way, as shown in FIG. 4B, the bladder interior 54 is pushed or inflated (expanded) to apply a force to the bladder outer surface 24, in general, and flow-distribution pathways 14, in particular, to push the resin 22 against and into the infused preform lay-up 16 and, in turn, the preform lay-up 16 against the clamshell-mold inner surface 30, for consolidation, degassing, and curing. As the increased heat and air pressure are applied to the bladder interior 54, this expansion of the bladder interior 54 and the flexibility or pliability of the bladder 12 cause the textured bladder outer surface 24 to be smoothed and/or flattened, such that the textured surface and flow pathways are removed. In the figure, an amount of the expansion is represented by a distance defined between the dotted line and preform-lay-up inner surface 58. And, although the heat increases the viscosity of the resin 22 to a level higher than typical for the infusion, the level is still low enough to allow the preform lay-up 16 to be compacted or consolidated under pressure. The application of the pressure and heat continues to fully fill (i.e., saturate) the preform lay-up 16 with the resin 22 to form the composite part. During this phase, excess resin 22 may bleed from the line 44.

The composite part is cured at the required temperature. The pressure and heat are continued to be applied until the composite part is fully cured.

Upon such curing, the pressure is evacuated, released, or vented from the flexible-bladder interior 54 via the air-relief cavity 56, The cured composite part is allowed to cool down below the glass transition temperature of the composite part to a sufficiently rigid, formed shape of the composite part.

It should be readily appreciated by those having ordinary skill in the related art that the clamshell mold 20 and pneumatic fitting can have any suitable structure to allow the air pressure to be applied to the bladder interior 54. Also, the bladder 12 can be heated to any suitable temperature in any suitable manner. And, the bladder 12, composite part, clamshell mold 20, and tooling hardware can be placed in any suitable manner in any suitable heater, in general, and oven, in particular. Furthermore, the forming air pressure can be applied to and released from the cavity of the clamshell mold 20 and bladder interior 54 and adjusted in any suitable manner and be any suitable amount. In addition, the entrapped air and gases can completely escape or evacuate and the excess or residual resin 22 can bleed away from the infused preform lay-up 16 in any suitable manner. Moreover, the cured composite part can be cooled down in any suitable manner, and the flow of the resin 22 can be halted in any suitable manner. The composite part can have any suitable geometry as well.

The cured composite part is manually removed from the clamshell mold 20, following which the still-heated and soft bladder 12 is deflated. This deflation allows the bladder 12 to move apart from and, thus, be removed from the composite part. In other words, the bladder 12 is still heated above its transition temperature so that it is pliable and can be extracted from the composite part. If the bladder 12 is not hot enough after removal from the mold, heat may be locally applied again to the bladder until it is sufficiently flexible for removal. The still-heated and soft bladder 12 may be manually placed in a forming tool (not shown) to which air pressure is configured to be applied for resetting a shape of the bladder 12 for a next cycle of infusion and formation of a composite part.

The system 10 requires few consumables compared to other resin infusion manufacturing processes. The infusion-flow medium is integrally formed on the bladder 12 so that it does not require any manual application or lay-up. Also, the infusion-flow medium is basically removed by applying heat and pressure to the bladder 12 surface, so it does not dictate the surface finish or quality of the interior surface of the formed part.

While the invention has been described in detail in connection with only a limited number of embodiments, it should be readily appreciated that the invention is not limited to such disclosed embodiments. Rather, the invention can be modified to incorporate any number of variations, alterations, substitutions, or equivalent arrangements not heretofore described, but which are commensurate with the spirit and scope of the invention. Additionally, while various non-limiting embodiments of the invention have been described, it is to be readily appreciated that aspects of the invention may include only some of the described embodiments. Accordingly, the invention is not to be seen as limited by the foregoing description, but is only limited by the scope of the appended claims.

I claim:

1. A resin-infusion system for manufacture of a composite part, the system comprising:
    an inflatable rigid bladder defining at least one infusion-flow pathway on an outer surface thereof;
    a preform lay-up formed on the bladder such that the infusion-flow pathway defines space between the bladder and preform lay-up;
    a mold into which the bladder and preform lay-up are placed such that the preform lay-up is constrained against the mold; and
    a resin injection system configured to feed resin into and to flow along the infusion-flow pathway and be infused into the preform lay-up;
    wherein the bladder is configured to expand during an expansion process against the infused preform lay-up during consolidation and curing such that the infusion-flow pathway is flattened against the preform layup due to the expansion of the bladder resulting in a smooth surface of the finished part and the pathway is reformed when pressure is evacuated from the bladder after inflation.

2. The system of claim 1, wherein the at least one infusion-flow pathway is integrally textured onto an outer surface of the bladder.

3. The system of claim 1, wherein the at least one infusion-flow pathway extends substantially linearly along the bladder from one end of the bladder to the other end of the bladder.

4. The system of claim 3, wherein the at least one infusion-flow pathway extends along the bladder in a non-parallel manner with respect to a longitudinal axis defined by the bladder.

5. The system of claim 4, wherein the at least one infusion-flow pathway extends along the bladder at about forty-five degrees relative to the longitudinal axis.

6. The system of claim 4, wherein the at least one infusion-flow pathway winds completely about the bladder.

7. The system of claim 1, wherein a transverse cross-section of the at least one infusion-flow pathway is substantially hemispherical.

8. The system of claim 1, wherein the at least one infusion pathway includes a first set of the infusion-flow pathways that are substantially parallel with respect to each other and, a second set of the infusion-flow pathways that are substantially parallel with respect to each other and substantially perpendicular with respect to the first set of the infusion-flow pathways.

9. The system of claim 1, wherein the resin is injected into the mold and a resin-feed cavity allows the injected resin to flow between the bladder and preform lay-up and feeds the resin into the infusion-flow medium for the flowing of the resin along the infusion-flow medium to infuse the preform lay-up.

10. The system of claim 1, wherein heat and pressure are applied to expand the bladder against the preform lay-up to flatten the at least one infusion-flow pathway.

* * * * *